Oct. 2, 1928.
M. W. WYSONG
1,686,196
UNIVERSAL TANDEM JOINT
Original Filed Feb. 18, 1926  2 Sheets-Sheet 1
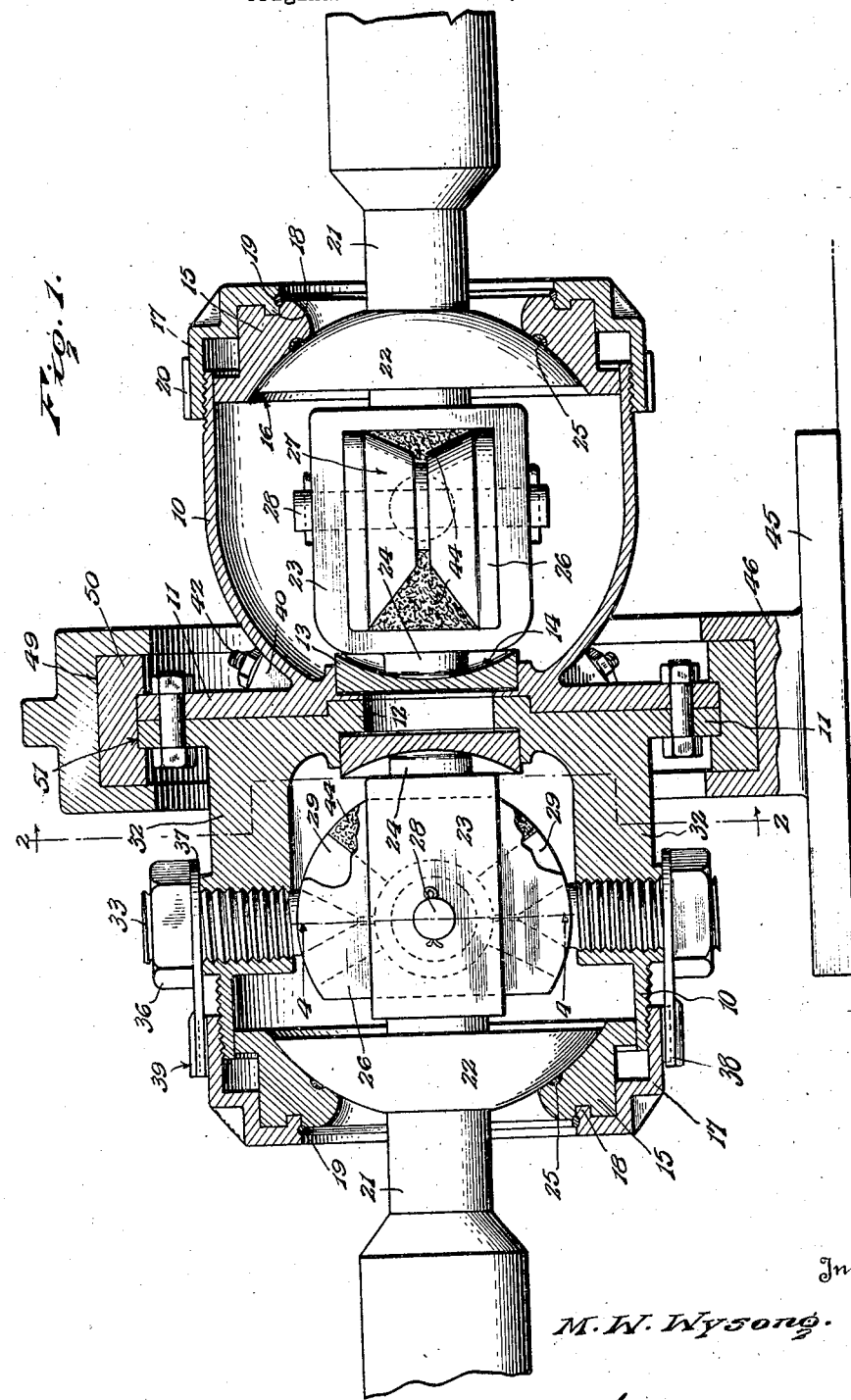

Oct. 2, 1928.
M. W. WYSONG
1,686,196
UNIVERSAL TANDEM JOINT
Original Filed Feb. 18, 1926   2 Sheets-Sheet 2
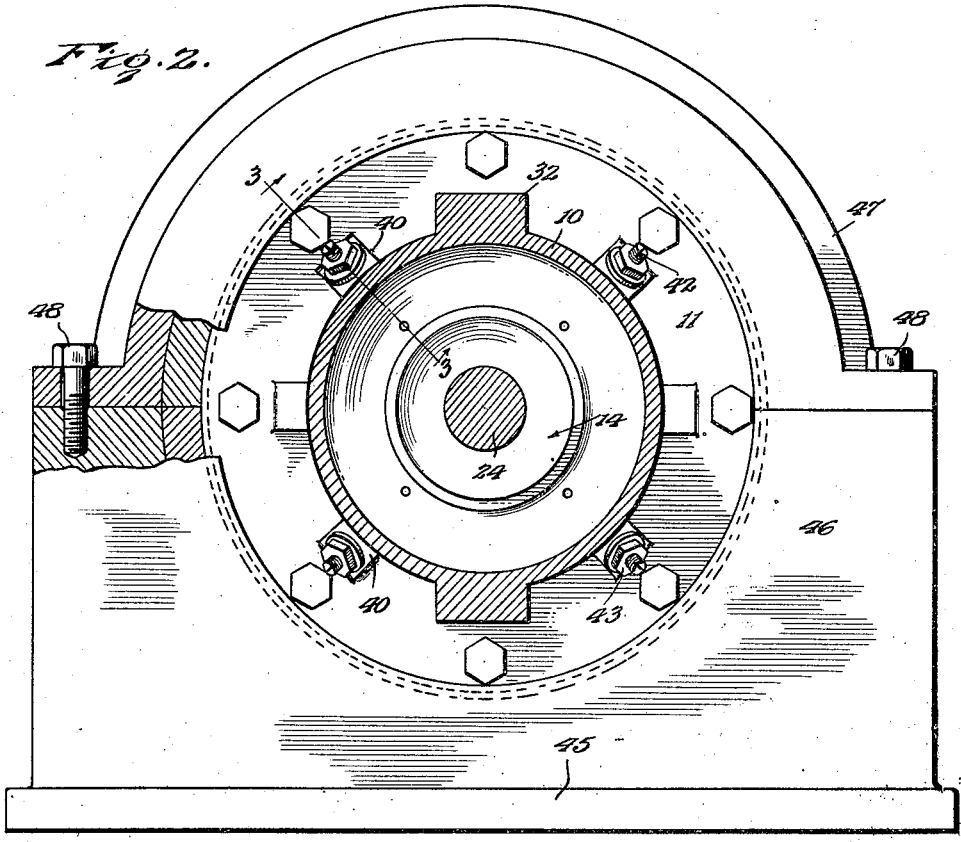
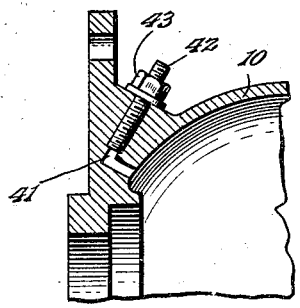
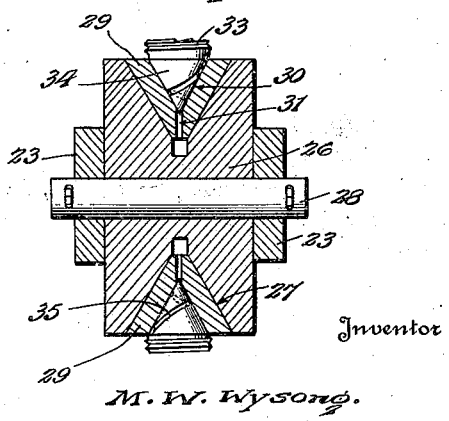
Inventor
M. W. Wysong.
By Leary Lacey, Attorneys Patented Oct. 2, 1928.

1,686,196

UNITED STATES PATENT OFFICE.

MAXWELL W. WYSONG, OF NORTH PLAINFIELD, NEW JERSEY, ASSIGNOR OF ONE-HALF TO HERBERT C. POOLE, OF NEWARK, NEW JERSEY.

UNIVERSAL TANDEM JOINT.

Application filed February 18, 1926, Serial No. 89,152. Renewed August 1, 1928.

This invention relates to an improved universal tandem joint and seeks, among other objects, to provide a joint especially adapted for use in conjunction with motor drives for machinery, dynamo and motor connections, or the like, and, in fact, almost any driving and driven elements requiring a short out of line connection.

The invention seeks, as a further object, to provide a joint embodying a double ended joint member composed of companion universal joint units each substantially of the character shown in my co-pending application for a universal joint, filed February 18, 1926, Serial No. 89,149.

And the invention seeks, as a still further object, to provide an improved mounting for rigidly but rotatably supporting the double ended joint member.

Other objects of the invention not specifically mentioned in the foregoing will appear during the course of the following description.

In the accompanying drawings:

Figure 1 is a longitudinal vertical sectional view taken medially through the improved tandem joint.

Figure 2 is a transverse sectional view on the line 2—2 of Figure 1, looking in the direction indicated by the arrows.

Figure 3 is a detail sectional view on the line 3—3 of Figure 2, looking in the direction indicated by the arrows, and showing one of the balancing pins.

Figure 4 is a detail sectional view on the line 4—4 of Figure 1, looking in the direction indicated by the arrows.

In carrying the invention into effect, I employ a double ended joint member embodying companion axially alined joint units which are substantially identical and include similar shells 10 rounded at corresponding ends thereof. Formed on said shells are mating annular flanges 11 bolted or otherwise rigidly secured together in abutting relation. One of said shells is formed at its inner end with an annular socket and projecting from the other of said shells is a pilot flange 12 snugly fitting in said socket for centering the shells with respect to each other.

Fixed within the inner ends of the shells 10 are bearing cups 13 having spherical faces 14, and slidably fitting in the outer ends of the shells are companion annular bearing cups 15 having spherical faces 16. Screwed over the outer ends of the shells are caps 17 offset to snugly surround the cups 15, and formed on said caps are flanges 18 fitting in suitable grooves in the outer end faces of the cups. The caps and the cups are preferably united by solder connections, as indicated at 19, and formed on the outer peripheries of the caps are circumferentially spaced ribs 20.

Extending into the shells 10 are shafts 21, either of which may be considered as a drive shaft and the other as a driven shaft. These shafts are formed with spherically shaped flanges or bearing members 22 which fit the spherical faces 16 of the cups 15, and formed on said shafts at their inner ends are yokes 23. Rising from the inner end bars of said yokes are knob-like bearing members 24 having spherical end faces to coact with the spherical faces 14 of the bearing cups 13. Thus, the bearing members 22 and 24 will coact with the cups 13 and 15 for centering the shafts with respect to the shells 10, and countersunk in the cups 15 to frictionally bear against the members 22 are appropriate gaskets 25 for excluding dust as well as retaining lubricant within the shells.

Snugly fitting in the yokes 23 of the shafts 21 are spool-shaped cores 26 which are provided with V-shaped grooves 27, and extending transversely through the side bars of the yokes and through said cores are center pins 28 locked against endwise displacement by suitable keys, the grooves 27 of the cores being accurately formed to extend in concentric relation to the axes of said pins. Slidably fitting in the groove of each of the cores is a pair of segmental shoes 29. As shown in Figure 4, these shoes are substantially V-shaped in cross section to seat flat against the side walls of the grooves, and formed in said shoes are conical sockets 30 to which lead oil passages 31 so that lubricant may readily circulate through said sockets. Formed on each of the shells 10 at opposite sides thereof is a pair of bosses 32, and screwed through each pair of bosses is a pair of axially alined pivot pins 33 having conical inner terminals 34 fitting in the sockets 30 of one of the pairs of shoes respectively, the terminals of said pins being provided with oil grooves 35. Screwed on the outer ends of the pins 33 are lock nuts 36, and clamped beneath said nuts are locking washers 37 for the nuts. These washers are provided with radial lugs 38 which overhang the caps 17 of the shells 10 and are provided with sockets 39 to selectively receive the ribs 20 of said caps so that the washers not only function to lock the nuts but also function to lock the caps in adjusted position.

Lying in the angles between the shells 10 and flanges 11 are circumferentially spaced reinforcing webs 40, and formed through certain of said webs, as seen in Figure 3, are oil passages 41 which enter the shells so that lubricant may be introduced into the shells through said passages. Screwed into the outer ends of the passages are balancing pins 42 which may be adjusted radially for balancing the shells, and screwed on said pins are lock nuts 43 secured in adjusted position by suitable locking washers. Preferably, the shells 10 are initially filled about two-thirds full with hard grease, and fitting in the grooves 27 of the cores 26 are fibrous packings 44 which are saturated with light lubricating oil. The bearing surfaces of the joint units will thus be effectually lubricated.

As will now be perceived, the shoes 26 of each unit may turn on the pins 33 of said unit so that the shaft 21 of the unit may rock in one plane about the axes of said pins. Furthermore, the shoes of each unit may slide in the channel 27 of the core 26 of the unit so that the shaft 21 of said unit may rock about the axis of the pin 28 of the unit in a plane at a right angle to the former plane of movement of the shaft. Thus, the shafts 21 are each mounted for independent angular movement in different planes lying at a right angle to each other. By adjusting the pins 33, any play in the direction of the axes of said pins may be taken up, while by adjusting the caps 17, any endwise play of the shafts may likewise be taken up so that any undue looseness which may develop between the bearing surfaces may be easily eliminated.

Mounting the double ended joint member is a pillow block including a base 45 on which is formed a pedestal 46, and mating with the pedestal is a cap 47 detachably secured to the pedestal by bolts 48. The pedestal and cap are formed with an annular channel 49, and rotatably fitting in said channel is a bearing ring 50 which may be of bronze or other suitable material. As brought out in Figure 1, this ring is provided at its inner circumference with an annular groove 51 which snugly receives the peripheral margins of the mating flanges 11 of the shells 10 of the joint member while, as brought out in Figure 2, the bearing ring is formed of mating semi-circular sections so that said ring may be readily assembled about said flanges. Preferably, the bearing ring is appropriately fixed to the flanges 11 to turn in unison therewith so that the bearing ring will cooperate with the pillow block for journaling the double ended joint member. Thus, the joint member will be rigidly supported while, when either of the shafts 21 is rotated, the torque will be transmitted through said member for driving the other shaft.

Having thus described the invention, what I claim is:

1. A universal tandem joint including a double ended joint member composed of separate universal joint units, means connecting said units with each other and means rotatably mounting said member and limiting said units against separation to provide a reinforcement for said connecting means.

2. A universal tandem joint including a double ended joint member composed of separate universal joint units, means connecting said units with each other, a pedestal, a cap mating with the pedestal, and a bearing ring journaled by said cap and pedestal and rotatably supporting said member, the ring being provided with means limiting said units against separation.

3. A universal tandem joint including a double ended joint member composed of companion universal joint units having mating abutting flanges, means rigidly securing said flanges together, and means embracing said flanges and rotatably supporting the joint member and constituting an auxiliary means for holding the flanges assembled.

4. A universal tandem joint including a double ended joint member composed of companion universal joint units having mating abutting flanges, means securing said flanges together, a pedestal, a cap mating with the pedestal, and a bearing ring grooved to fit the peripheral margins of said flanges and journaled by the pedestal and cap for rotatably supporting said joint member.

5. A universal tandem joint including a double ended joint member composed of companion universal joint units each having a shell, the shell of one of said units being provided with a recess and the shell of the other of said units being provided with a flange fitting in said recess for centering the units with respect to each other, means rigidly securing the units together to form the joint member, and means rotatably mounting said member.

6. In a universal tandem joint, the combination with companion universal joint units each including a shell having a flange thereon, of means rigidly securing the flanges of said shells together to form a double ended joint member, and means embracing said flanges and rotatably supporting said member.

7. A universal tandem joint including a double-ended joint member composed of separate universal joint units, primary means limiting said units against separation, and secondary means limiting said units against separation and journaling the member.

8. A universal tandem joint including a double-ended joint member composed of separate universal joint units, means connecting said units with each other and including a part on each of said units, and means journaling said parts for rotatably supporting the member.

9. A universal joint of the class described comprising companion joint units having mating flanges, means securing the flanges together, and means for rotatably supporting the units comprising a bearing having a continuous annular seat, and a ring rotatably mounted in the seat and formed in sections, the ring being disposed with its sections, surrounding the said flanges and having an interior channel accommodating the margins of the flanges.

In testimony whereof I affix my signature.

MAXWELL W. WYSONG. [L. S.]